United States Patent [19]

Hilliker

[11] 3,806,668

[45] Apr. 23, 1974

[54] INFORMATION PLAYBACK SYSTEM

[75] Inventor: Stephen Earl Hilliker, Mooresville, Ind.

[73] Assignee: RCA Corporation, New York, N.Y.

[22] Filed: June 1, 1972

[21] Appl. No.: 258,645

[30] Foreign Application Priority Data

Apr. 19, 1972 Great Britain .................... 18037/72

[52] U.S. Cl. ............................................ 179/100.4

[51] Int. Cl. ............................................ G11b 3/00

[58] Field of Search ............. 179/100.4 M, 100.4 D; 274/9 R

[56] References Cited

UNITED STATES PATENTS

| | | | |
|---|---|---|---|
| 2,469,803 | 5/1949 | Weathers | 179/100.4 M |
| 2,548,211 | 4/1951 | Frantz | 179/100.4 M |
| 2,682,579 | 6/1954 | Weathers | 179/100.4 M |
| 2,436,946 | 3/1948 | Tatro | 179/100.4 M |
| 2,118,602 | 5/1938 | Goldsmith | 179/100.4 D |
| 3,406,264 | 10/1968 | Phillipson et al. | 179/100.4 D |

*Primary Examiner*—Gareth D. Shaw
*Assistant Examiner*—Mark Edward Nusbaum
*Attorney, Agent, or Firm*—Eugene M. Whitacre; William H. Meagher

[57] ABSTRACT

Information is recorded as capacitive variations in a spiral groove on a disc record. The capacitive variations are detected by a tracking stylus and coupled to a stage including a source applying signals to a tuned circuit. The detected capacitive variations cause signals modulated by the record information to develop in the tuned circuit. The stage is controlled so that a predetermined relationship is maintained between the signals applied to the tuned circuit and the tuned circuit response.

The tuned circuit may include a transmission line to minimize the total shunt capacity of the circuit. This increases the percentage modulation of the signals developed in the tuned circuit by increasing the ratio of the detected capacitive variations to the total shunt capacity of the tuned circuit.

12 Claims, 3 Drawing Figures

INFORMATION PLAYBACK SYSTEM

The present invention relates to an information playback system, and more particularly, to a video information playback system.

In certain information playback systems, video information is recorded on a disc record by means of capacitive variations. One video disc record incorporates geometric variations in the bottom of a spiral groove in the disc surface. The groove disc surface includes a conductive material covered with a thin coating of dielectric material. A tracking stylus has a conductive surface which cooperates with the conductive material and dielectric coating to form a capacitance which varies due to the geometric variations as the record is rotated during playback. Systems of this type are shown in a U.S. Pat. Application Ser. No. 126,678, filed Mar. 22, 1971, for Thomas Osborne Stanley and entitled, "HIGH-DENSITY INFORMATION RECORDS AND PLAYBACK APPARATUS THEREFOR," and a U.S. Pat. Application Ser. No. 126,772, filed Mar. 22, 1971, for Jon Kaufmann Clemens and entitled, "INFORMATION RECORDS AND RECORDING/PLAYBACK SYSTEMS THEREFOR." Both applications are assigned to the RCA Corporation.

In systems of the above-described type, a stylus riding in a groove on the disc record detects the capacitive variations as the record is rotated. Detected capacitive variations are coupled to and vary the resonant frequency of a tuned circuit. The tuned circuit is energized by a fixed frequency oscillator. Since fixed frequency oscillator signals are applied to the tuned circuit as the resonant frequency of the tuned circuit varies (due to the variations of the capacitance on the record) the response of the tuned circuit to the excitation signal voltage changes as a function of the record information. This provides output signals whose amplitude varies as a function of the recorded information. The amplitude varying output signals are detected by a peak detector, amplified, and applied to the playback system signal processing circuits.

Although systems of the above-described type are very satisfactory and provide excellent performance, widely varying conditions encountered during use can impair performance. These varying conditions include changes in the stylus caused by aging, replacement, or vibration during playback. Moreover, movement of the stylus during cuing or operation with different records exhibiting slightly different characteristics, can also contribute to the widely varying operating conditions. The varying conditions can result in a change in the relationship between the frequency of the oscillator output signals and the frequency response of the tuned circuit.

One change in the relationship between the oscillator output signals and tuned circuit frequency response is the separation between the nominal center frequency of the tuned circuit and the frequency of the oscillator signals. The nominal center frequency of the tuned circuit is the center frequency of the tuned circuit including the average capacity of the capacitive variations coupled to the circuit. Where this relationship changes, the operating point shifts to a different location on the slope of the tuned circuit response. If the shifts are recurrent, undesired amplitude variations will be detected by the peak detector, thereby degrading the performance of the playback system. Moreover, any shift in the operating point on the tuned circuit may cause the system to operate on a non-linear portion of the response, further degrading the operation of the system.

Another change in the relationship between the oscillator output signals and the tuned circuit frequency response is the amount of energy injected into the tuned circuit. Where the amplitude of the oscillator output signals vary, the energy injected into the tuned circuit will likewise vary. Such variations in injected energy introduce amplitude shifts in the signal detected by the peak detector. Moreover, where the oscillator output signal amplitude variations are recurrent, these variations will be detected by the peak detector. Both types of detected variation of the injected energy degrade the performance of the system.

The figure of merit or Q of the tuned circuit will increase where damage to the stylus causes the energy losses of the stylus and record to no longer be coupled to the tuned circuit. One type of damage to the stylus which will cause the Q of the tuned circuit to increase is an open circuit in the conductive path leading from the stylus to the tuned circuit. Under these conditions, the amplitude of the oscillator signals will increase due to the increased impedance of the oscillator load. The increased amplitude may be sufficient to cause radiation exceeding proscribed limits. This problem may be further compounded since the damaged stylus may function as a radiator.

In systems of the above-described type, the percentage modulation of the signals detected by the peak detector is a function of the ratio of the change in capacitance detected by the stylus (and coupled to the tuned circuit) to the equivalent total shunt capacity of the tuned circuit. Since the change in capacitance may be very small, the percentage modulation of the detected signal may also be very small. This makes recovery of the recorded information difficult due to swamping by circuit and other noise introduced into the system. It is therefore desirable to increase the percentage modulation of the detected signal by minimizing the total equivalent total shunt capacity of the tuned circuit.

An information playback system embodying the present invention includes a record medium having information recorded thereon. A first means recovers the information recorded on the medium. A second means, including a source of signals and a tuned circuit having a response when energized by signal energy, is coupled to the first means. The source of signals is coupled to the tuned circuit to energize the circuit such that signals modulated by the recorded information are developed in the tuned circuit. A third means is coupled to the second means for maintaining a predetermined relationship between the signals applied to the tuned circuit and the tuned circuit response.

In accordance with a feature of the present invention, the tuned circuit may include a transmission line having a high characteristic impedance such that it exhibits a small equivalent total shunt capacity. This increases the percentage modulation of the signal to be detected by increasing the ratio of the change in capacitance to the equivalent total shunt capacity of the tuned circuit.

A complete understanding of the present invention may be obtained from the following detailed description of a specific embodiment thereof, when taken in conjunction with the accompanying drawings, in which.

Figure 1:
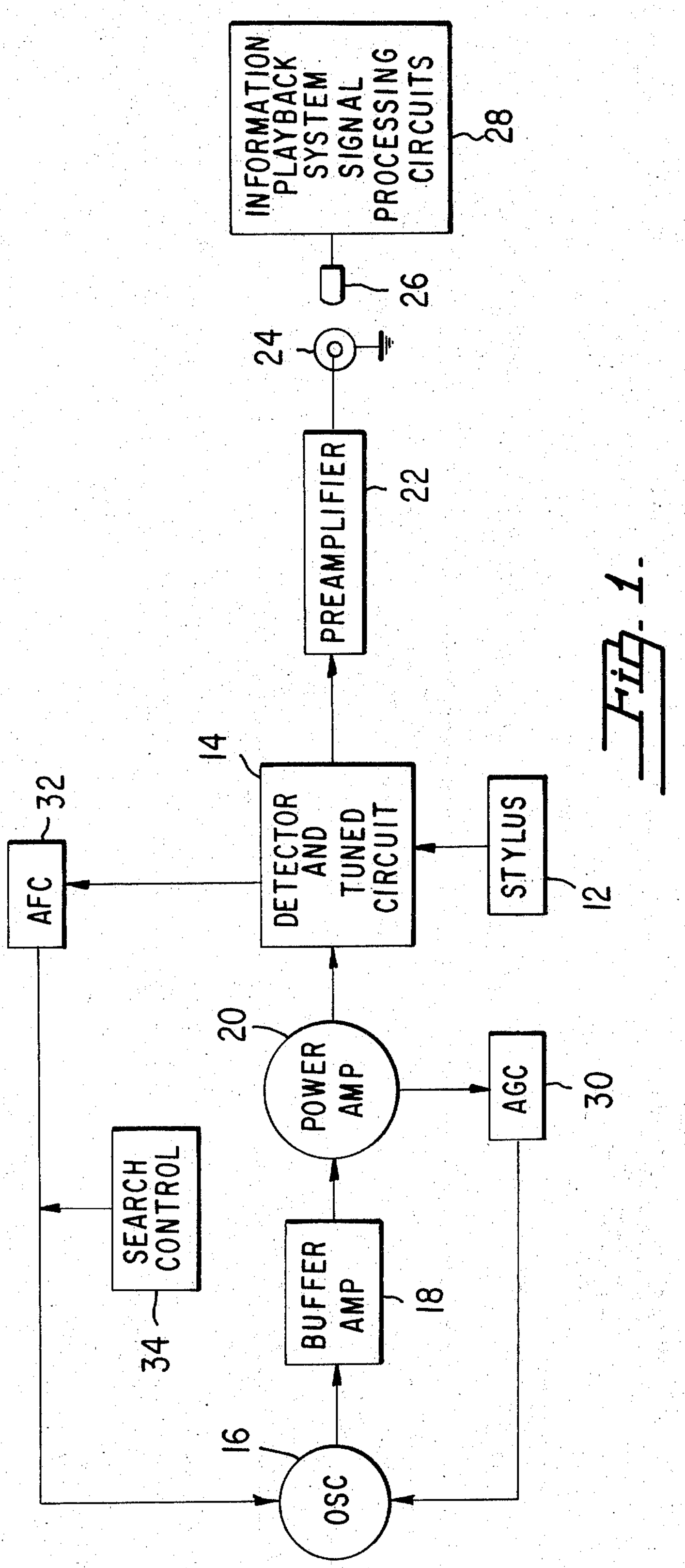
FIG. 1 is a block diagram of an information playback system embodying the present invention.

Reference is now made to FIG. 1. A stylus 12 detects capacitive variations in a record medium, not shown. The capacitive variations are coupled to a detector and tuned circuit stage 14. The detector and tuned circuit stage 14 includes a circuit whose resonant frequency is varied by the detected capacitive variations on the record, and a peak detector. An oscillator stage 16 provides output signals which are coupled to the detector and tuned circuits stage 14. The oscillator output signals are coupled by means of a buffer amplifier 18 providing isolation between the oscillator and following stages and a power amplifier 20. The signals coupled to the stage 14 energize the tuned circuit. As the resonant frequency of the tuned circuit is varied due to the variations of the capacitance on the record medium, the response of the tuned circuit to the excitation voltage from the oscillator varies. The variations are detected by the peak detector and are applied to a preamplifier stage 22 before application via jack 24 and plug 26 to the information playback system signal processing circuits 28.

An automatic gain control stage 30 detects the level of signal being injected by the power amplifier 20 into the tuned circuit of stage 14. The automatic gain control stage 30 adjusts the gain of the oscillator stage 16 to insure that the output signals from the oscillator stage are such that a signal of constant amplitude is injected into the tuned circuit in stage 14.

An automatic frequency control stage 32 is coupled between the detector and tuned circuit stage 14 and the oscillator stage 16. The automatic frequency control stage 32 adjusts the operating frequency of the oscillator stage to maintain a constant separation between the nominal center frequency of the tuned circuit of stage 14 and the frequency of the oscillator stage output signals. This insures that the system operates at the desired point on the slope of the tuned circuit response. For information playback systems described in the two U.S. Pat. Applications noted above, the operating point is on the lower frequency slope or skirt of the tuned circuit frequency response. The automatic gain control stage 30 and automatic frequency control stage 32 each assure that a predetermined relationship exists between the excitation signals applied to the tuned circuit and the tuned circuit frequency response.

A search control stage 34 coupled to the oscillator stage is actuated when the frequency separation between the nominal frequency of the tuned circuit and the frequency of the oscillator stage output signals deviate beyond a set limit. Such deviations may occur when conditions are present which seriously affect the resonant frequency of the tuned circuit in stage 14, as for example when the stylus is removed from the record during cuing. When the search control stage 34 is actuated, the operating frequency of the oscillator stage 16 adjusts to an initial search condition. The operating frequency is adjusted such that a known initial relationship is established between the nominal center frequency of the tuned circuit and the frequency of the oscillator stage output signals. At the initial search condition, the frequency of the oscillator stage output signals is well below its normal operating frequency but within the pull-in range of the automatic frequency control stage 32. The automatic frequency control stage 32 sweeps the operating frequency of the oscillator stage 16 until the predetermined frequency relationship between the nominal center frequency of the tuned circuit and the frequency of the oscillator stage output signals are re-established.

It should be recognized that many modifications to the information play back system are possible, all of which still use the present invention. For example, capacitive variations detected by the stylus can be coupled to vary the operating frequency of the oscillator output signals. The oscillator output signals are thereby modulated by the recorded information. The modulated oscillator output signals are injected into the tuned circuit. In another modification, the automatic frequency control stage controls the resonant frequency of the nominal center frequency of the tuned circuit in the detector and tuned circuit stage. The tuned circuit center frequency is adjusted to track frequency changes (below the recorded information frequencies) occurring in the oscillator output signals. The search control stage can be coupled to and control the frequency of either the oscillator output signals or the tuned circuit. Still another modification is to provide automatic gain control to the amplifying stages between the oscillator and the tuned circuit. The automatic gain control still insures that constant amplitude signals are injected into the tuned circuit. In all cases, a predetermined relationship is maintained between the excitation signals applied to the tuned circuit and the tuned circuit frequency response.

Still another modification is to employ a phase shift detection system. Since the detected capacitance variations coupled to the tuned circuit not only shift the nominal center frequency of the tuned circuit, but simultaneously shift the phase response of the circuit, the present invention is suitable for use with a phase detection system, should that be desired. The phase response of the tuned circuit occurs over the upper and lower sloped portions of the tuned circuit frequency response on both sides of the center frequency of the circuit, thereby providing an extended linear range of operation. The frequency of the oscillator stage output signals are adjusted to coincide with the nominal center frequency of the tuned circuit where no phase shift occurs.

Figure 2:
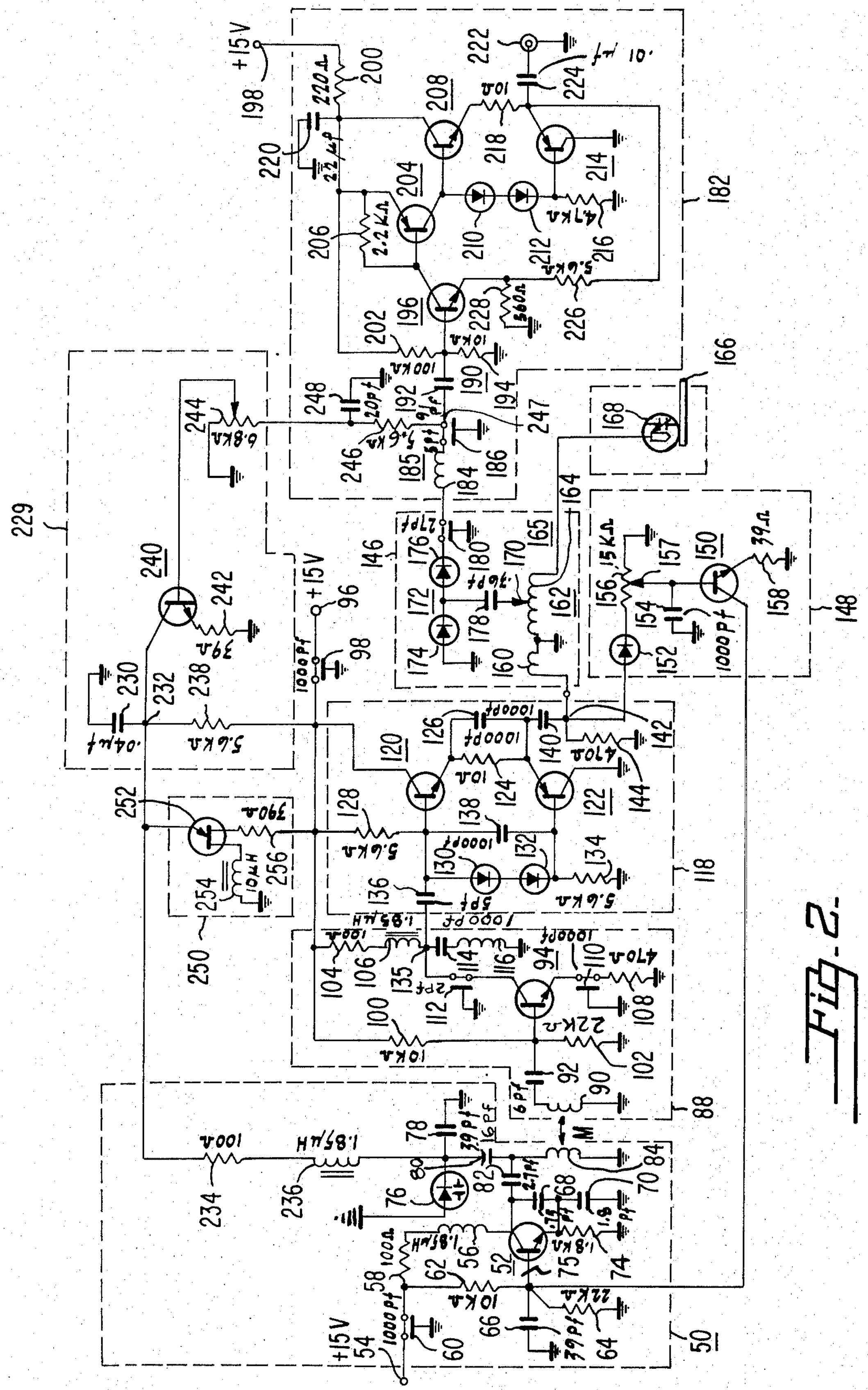
FIG. 2 is a schematic circuit diagram of the information playback system shown in FIG. 1.
Figure 3:
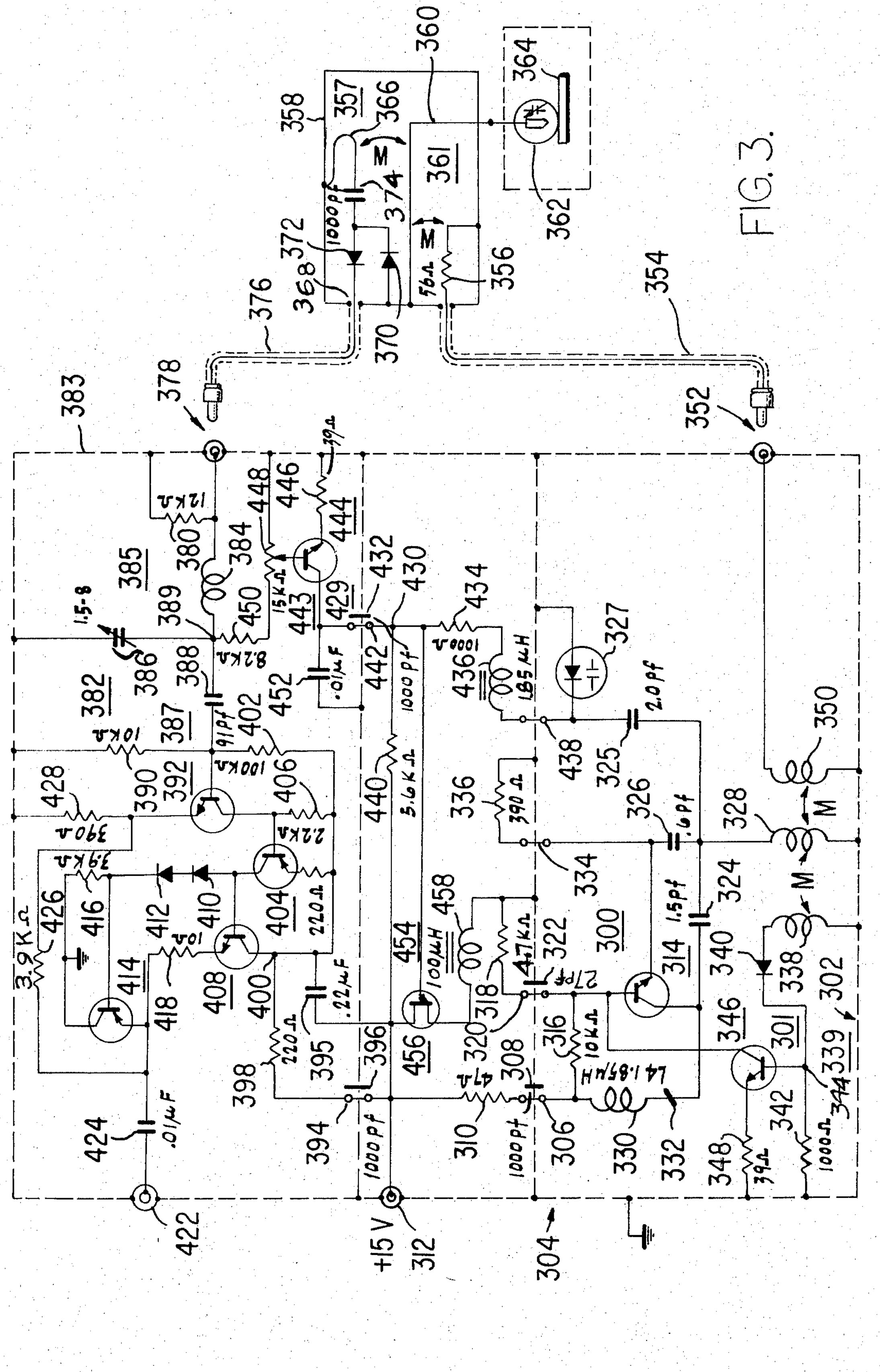
FIG. 3 is a schematic circuit diagram of an alternate embodiment of the present invention employing a transmission line tuned circuit.

Reference is now made to FIG. 2. An oscillator stage 50 includes a transistor 52 connected as a Colpitts type oscillator. The collector electrode of the transistor 52 is connected to a source of operating potential applied to a terminal 54 through an inductor 56 and a resistor 58. A feedthrough 60 bypasses the terminal 54 for signal frequencies to prevent the oscillator energy from entering the source of operating potential. The source of operating potential at the terminal 54 is additionally applied to the base electrode of the transistor 52 by means of the voltage dividing resistors 62 and 64. A capacitor 66 connects the base electrode of the transistor 52 to a point of fixed reference potential, shown as ground. The collector and emitter electrodes of transistor 52 are interconnected by a capacitor 68 to provide, in conjunction with capacitor 70, a sufficient amount of feedback from the collector electrode to the emitter electrode to sustain oscillation. A resistor 74 couples the emitter electrode of transistor 52 to ground. A ferrite bead 75 is applied to the base electrode of transistor 52 to suppress spurious resonances above the operating frequency of the oscillator stage 50.

The operating frequency of the oscillator stage 50 is determined by the tuned circuit coupled to the collector electrode of the transistor 52. The tuned circuit includes a variable capacitance diode 76, capacitors 68, 70, 78, 80 and 82 and an inductor 84. The variable capacitance diode 76 provides a frequency adjustment for the operating frequency of the oscillator stage 50. The function and control of the operating frequency of the oscillator 50 will be explained in greater detail hereinafter in conjunction with the description of the portion of the circuit providing the functions of the automatic frequency control stage 32 and search control stage 34 shown in FIG. 1.

Output signals from the oscillator stage 50 are applied to a buffer amplifier stage 88. The output signals from the oscillator stage 50 developed across the inductor 84 are inductively coupled to an inductor 90 which is part of the buffer amplifier stage 88. A capacitor 92 couples the signals to the base electrode of a transistor 94. Operating potential for the transistor 94 is obtained from a source of operating potential applied to a terminal 96, bypassed for signal frequencies by a feedthrough capacitor 98. The capacitor 98 prevents signal energy from entering the source of operating potential applied to the terminal 96. The operating potential is applied to the base electrode of transistor 94 by means of the voltage dividing resistors 100 and 102.

The operating potential at terminal 96 is applied to the collector electrode of the transistor 94 by means of the series connected resistor 104 and inductor 106. An emitter degeneration resistor 108 and a signal bypass feedthrough capacitor 110 are connected between the emitter electrode of the transistor 94 and ground. A tuned circuit including capacitor 112, an inductor 116 and stray circuit capacities is connected to the collector electrode of the transistor 94. Capacitor 114 prevents the source of operating potential at the terminal 96 from being shorted to ground through inductor 116. The tuned circuit serves as a shaping network to provide the proper frequency response for the buffer amplifier stage 88. The buffer amplifier stage 88 provides isolation between the oscillator stage 50 and other stages throughout the information playback system.

Output signals from the buffer amplifier stage 88 are applied to a power amplifier stage 118. The power amplifier stage includes an NPN transistor 120 and a PNP transistor 122 having their collector-emitter electrode current paths connected in series with a parallel connected resistor 124 and capacitor 126. The series combination is coupled between the source of operating potential applied to the terminal 96 and ground. Bias is applied to the base electrode of the transistors 120 and 122 by the series circuit including resistor 128, diodes 130 and 132, and resistor 134. The bias arrangement is such that both transistors 120 and 122 are biased at the threshold for conduction. Output signals from the buffer amplifier stage 88 developed at junction 135 are applied to the base electrodes of the transistor 120 and 122 by the capacitors 136 and 138. For signal frequencies, the capacitor 138 exhibits an extremely low reactance providing a low AC impedance coupling the base electrodes of the transistors 120 and 122.

Output signals from the power amplifier stage 118 are developed at junction 142 of a capacitor 140 and resistor 144. The signals are applied to a detector and tuned circuit stage 146 and an automatic gain control stage 148. The automatic gain control stage 148 insures that the signal voltage at the junction 142 remains constant. The signals at junction 142 are applied to the base electrode of a transistor 150 in the automatic gain control stage 148 by a peak detector circuit including a diode 152, capacitor 154, and variable resistor 156. The emitter electrode of the transistor 150 is returned to ground by a resistor 158, and the collector electrode of the transistor 150 is connected to the base electrode of the transistor 52.

The collector-emitter current path of the transistor 150 is connected in the bias circuit for the oscillator stage transistor 52. The impedance of the collector-emitter electrode current path of the transistor 150 controls the bias of the transistor 52, and hence its gain. By adjusting the position of the tap 157 on the variable resistor 156, the operation of the automatic gain control stage is controlled. This allows the signal voltage level at junction 142 to be set to a desired level. As the signal voltage at the junction 142 increases, transistor 150 is biased toward heavier conduction and the impedance of the collector-emitter current path of the transistor is reduced. The reduced impedance causes a lower bias voltage to be applied to the base electrode of the oscillator stage transistor 52, and the gain of the transistor 52 is reduced. If the signal voltage at the junction 142 decreases, transistor 150 is biased for decreased conduction and the impedance of the collector-emitter electrode current path increases. The increased impedance causes a higher bias voltage to be applied to the base electrode of the transistor 52 and the gain of the transistor is increased.

Output signals from the power amplifier stage 118 are applied to a detector and tuned circuit stage 146. The signals developed at junction 142 are coupled to the primary winding 160 of a transformer 162 and, by transformer action, are coupled to the transformer tuned secondary winding 164. The transformer tuned secondary winding 164 is part of the tuned circuit 165 of the detector and tuned circuit stage 146. The tuned secondary winding, in conjunction with the stray capacitances and inductances of the circuit, has a nominal center frequency of 390 MHz. It should be noted that the nominal center frequency of the tuned circuit may vary depending on the construction of transformer 162 and position of adjacent circuit components. One suitable transformer is fabricated from 13 turns of silver plate 0.020 inch diameter wire wound with a 0.185 inch diameter coil and having tap connections at two and six turns, respectively, from one end.

Frequency modulated capacitive variations ranging over a band of frequencies from 500 KHz to 7.0 MHz recorded on a disc record 166 are detected by a stylus 168. The stylus and record may be of the type described in the two U.S. Pat. Applications noted above. The capacitive variations are coupled to the secondary winding 164. Detected capacitive variations vary the resonant frequency of the tuned circuit 165 plus and minus 100 KHz from its nominal center frequency at a rate ranging from 500 KHz to 7.0 MHz. Since the tuned circuit 165 is energized by the oscillator stage output signals applied via the buffer and power amplifier stages 88 and 118 to the primary winding 160 of transformer 162, as the resonant frequency of the tuned circuit 165 varies, the response of the tuned circuit to the excitation signal voltage changes as a function of the record information. Consequently, the signals developed at tap 170 on the tuned secondary winding 164 also are modulated by the recorded information.

The modulated signals at the tap 170 are loosely coupled to a doubler type detector circuit 172. The detector circuit 172 includes the diodes 174 and 176 and the capacitors 178 and 180. The doubler type detector circuit 172 functions to peak detect the output signals developed at the tap 170. Negative going portions of the signal developed at the tap 170 causes current to flow from ground through the diode 174, capacitor 178 and the tuned secondary winding 164 to ground. This charges capacitor 178 positive to negative from the junction of the diodes 174 and 176 to the tap 170. On the positive going portions of the signal developed at tap 170, since capacitor 178 cannot discharge through diode 174, the voltage across capacitor 178 adds to the positive portion of the signal developed at the tap 170, causing a current to flow through the diode 176. High frequency signal components at the cathode of the diode 176 are filtered out by a feedthrough capacitor 180.

Output signals from the detector and tuned circuit stage 146 are applied to a preamplifier stage 182 before application to the information playback system signal processing circuits. The voltage developed across the capacitor 180 is applied to a peaking network 185 including an inductor 184 and feedthrough capacitor 186. The peaking network is coupled via a high pass filter 190 comprising a capacitor 192 and resistor 194 to the base electrode of an NPN transistor 196. The high pass filter eliminates circuit and record noise below 500 KHz, the lowest recorded signal frequency of interest. Base bias for the transistor 196 is obtained from a source of operating potential coupled to a terminal 198 via resistors 200 and 202. Operating potential is applied to the collector electrode of the transistor 196 and to the base electrode of a PNP transistor 204 by the resistor 200 and by a further resistor 206. The signals applied to the base electrode of the transistor 196 are coupled to the base electrode of the transistor 204, whose collector electrode is directly connected to the base electrode of an NPN transistor 208 and by means of the series connected diodes 210 and 212 to the base electrode of a PNP transistor 214. The junction of the cathode of the diode 212 and the base electrode of the transistor 214 is connected to ground by a resistor 216.

The emitter-collector electrode current paths of the NPN transistor 208 and PNP transistor 214 are serially connected via a resistor 218 between the resistor 200 and ground. A capacitor 220 is connected to the collector electrode of transistor 208 to provide filtering of the operating potential for the several transistors of the preamplifier stage 182. The transistors 208 and 214 are connected to an output jack terminal 222 by a capacitor 224. The transistors 208 and 214 are connected in the manner to provide a low output impedance at the jack 222 which is connected to the information playback system signal processing circuit, not shown. Negative feedback controls the gain of the preamplifier stage 182. The feedback is provided by a voltage obtained at the emiter electrode of the transistor 214 and applied to the emitter electrode of the transistor 196 by the voltage divider resistors 226 and 228.

The operating frequency of the oscillator stage 50 is adjustable over a range of frequencies varying from approximately 355 MHz to 420 MHz. When the variable capacitance diode 76 has maximum reverse bias applied across its cathode-anode electrodes, the device exhibits minimum capacity and the oscillator stage provides 420 MHz output signals to the detector and tuned circuit stage 146 via the buffer and preamplifier stages 88 and 118. When minimum reverse bias is applied across the cathode-anode electrodes of the variable capacitance diode 76, the device exhibits maximum capacity. Under these conditions, the oscillator provides 355 MHz output signals for the system. Under normal conditions the oscillator stage operates at 383 MHz, seven megahertz below the 390 nominal center frequency of the tuned circuit 165.

The bias for the variable capacitance diode is obtained from a voltage which develops at a junction 232, the voltage across a capacitor 230. The voltage at the junction 232 is applied to the variable capacitance diode 76 through a series connected resistor 234 and inductor 236. The inductor 236 decouples the signal energy of the oscillator stage from the junction 232. Capacitor 230 is charged from the source of operating potential applied to the terminal 96 through a resistor 238. The junction 232 is connected to ground through the collector-emitter electrode current path of a transistor 240 and an emitter resistor 242. The collector-emitter electrode current path of transistor 240 in conjunction with the resistor 238 and resistor 242 form a voltage divider circuit for the voltage applied to the terminal 96. The voltage at the junction 232 is determined by the impedance exhibited by the collector-emitter electrode current path of the transistor 240, which changes the ratio of the impedances of the voltage dividing circuit and, hence, the voltage at the junction 232.

The base electrode of the transistor 240 is connected by a variable resistor 214 and resistor 246 to the junction 247, the output of the peaking network 185. A capacitor 248 is connected between the junction of the resistors 244 and 246 and ground. Capacitor 248 limits the upper frequency response of the transistor 240 by shunting to ground high frequency signal components. This limits the frequency response of the automatic frequency control stage to below 5 KHz. Thus, the automatic frequency control stage operates well below the frequency range of the signal information recorded on the record medium, 500 KHz to 7.0 MHz. Changes in the voltage level from DC up to 5 KHz, occurring at the junction 247 are applied to the base electrode of the transistor 240 via the resistors 246 and 244 and control the conductivity of the collector-emitter electrode current path of the transistor. The changes in conductivity result in a change in the voltage at the junction 232, and hence a change in the reverse bias applied to the variable capacitance diode 76. The change is in a direction to maintain a constant frequency separation between the nominal center frequency of the tuned circuit 165 and the operating frequency of the oscillator stage 50.

If the nominal center frequency of the tuned circuit increases, the operating point on the tuned circuit frequency response will change and the signal injected into the tuned circuit 165 from the junction 142 will be located lower on the low frequency side of the tuned circuit frequency response than occurs during normal operation. Consequently, the voltage at the output of the detector circuit 172 and the junction 247 will decrease. As the voltage at the junction 247 decreases, a decreasing voltage is applied to the base electrode of the transsitor 240 causing the collector-emitter electrode current path of the device to exhibit an increased impedance. When this occurs, a greater voltage develops at the junction 232 and a greater reverse bias voltage is applied across the variable capacitance diode 76. An increase in reverse bias across the variable capacitance diode 76 causes the diode to exhibit a reduced capacity, and the operating frequency of the oscillator stage 50 increases. The increase in operating frequency is sufficient to re-establish the 7 MHz separation between the nominal center frequency of the tuned circuit 165 and the information playback system operates at the proper point on the slope on the tuned circuit frequency response.

If the nominal center frequency of the tuned circuit decreases, the operating point on the tuned circuit frequency response will change. The signal injected into the tuned circuit 165 will be located higher on the low frequency side of the tuned circuit frequency response than occurs during normal operation. Consequently, the voltage at the output of the detector circuit 172 and the junction 247 increases. An increasing bias voltage is applied to the base electrode of transistor 240 causing the collector-emitter electrode current path of the transistor to exhibit a decreasing impedance. Thus, the voltage at the junction 232 decreases and a reduced reverse bias is applied across the variable capacitance diode 76. The diode 76, under these conditions, displays an increased capacity, and the operating frequency of the oscillator stage 50 decreases. The decrease in operating frequency of the oscillator stage 50 is sufficient to re-establish the 7 MHz frequency separation between the nominal center frequency of the tuned circuit and the frequency of the oscillator output signal, and the information playback system operates at the proper point on the slope of the tuned circuit frequency response.

Where the frequency separation between the frequency of the oscillator output signal and the nominal center frequency of the tuned circuit exceeds a limit, as determined by the tap adjustment of variable resistor 244, the voltage at junction 247 decreases to a level where transistor 240 is biased out of conduction. The voltage at the collector electrode of transistor 240, junction 232, increases. A search control stage 250 senses the tuning voltage applied to the variable capacitance diode 76 from the junction 232. When the voltage at the junction 232 exceeds the turn-on voltage level for unijunction transistor, the search control stage 250 is rendered operative. The turn-on voltage level is reached when the operating frequency of the oscillator stage is above the nominal center frequency of the tuned circuit 165 on the high frequency slope of the tuned circuit frequency response.

Capacitor 230 charges toward a voltage level determined by the source of operating potential applied to the terminal 96. When the voltage at the junction 232 reaches approximately +11 volts, a unijunction transistor 232 is biased into conduction, and capacitor discharges through the emitter-first biase electrode current path of the unijunction transistor and an inductor 254 to ground. After capacitor 230 discharges, the unijunction transistor 252 becomes biased out of conduction. Operating potential for the unijunction transistor is obtained from the source of operating potential applied to the terminal 96 through the resistor 256 coupled to the transistor second base electrode.

The discharge of capacitor 230 causes the voltage at the junction 232 to drop. When this occurs the reverse bias across the variable capacitance diode 76 decreases and the device exhibits an increased capacity, causing the oscillator operating frequency to be readjusted to an initial condition. The oscillator output signal frequency at the initial condition is significantly below the normal operating point on the lower frequency side of the tuned circuit frequency response.

As the capacitor 230 begins to charge from the source of operating potential applied to the terminal 96 through the resistor 238, the voltage at the junction 232 increases. The increasing voltage causes an increased reverse bias to be applied across the variable capacitance diode 76. The changing capacitance of the variable capacitor diode 76 sweeps the oscillator stage operating frequency upward and the voltage at the junction 247 begins to rise. As the frequency of the output signal from the oscillator stage 50 begins to approach its proper position in relation to the nominal center frequency of the tuned circuit, a voltage develops at the junction 247 which biases the transistor 240 sufficiently into conduction to re-establish the 7 MHz separation between the frequency of the oscillator output signals and the nominal center frequency of the tuned circuit 165. If, however, the operating frequency of the oscillator stage 50 sweeps past its proper position, the search control stage 250 is actuated and the process is repeated.

Reference is now made to FIG. 5. An oscillator stage 300 and an automatic gain control stage 301 are enclosed in a compartment 302 of a conductive housing 304. The conductive housing 304 is connected to a point of fixed reference potential, shown as ground. Operating potential for the transistors within the compartment 302 is obtained from terminal 306 of a feedthrough capacitor 308. The terminal 306 is connected by a resistor 310 to a terminal 312 which is adapted to be energized by a source of operating potential.

The oscillator stage 300 includes a transistor 314. The voltage at the feedthrough capacitor terminal 306 is applied to the base electrode of the transistor 314 by means of the voltage divider resistors 316 and 318 coupled between the feedthrough capacitor terminal 306 and ground. The resistors 316 and 318 are interconnected by a terminal 320 of a feedthrough capacitor 322 connected to the base electrode of the transistor 314. The operating frequency of the oscillator stage 300 is determined by a tuned circuit coupled to the transistor 314. The tuned circuit includes the capacitors 324, 325 and 326, inductor 328, and variable capacitance diode 327. Operating potential for the collector electrode of the transistor 314 is obtained from the feedthrough capacitor terminal 306 via inductor 330. The inductor 330 is an RF choke which prevents the oscillator signals from entering the source of operating potential at the terminal 312. A ferrite bead 332 is provided to suppress spurious resonances above the operating frequency of the oscillator. The emitter electrode of the transistor 314 is returned to ground by a standoff terminal 334 and series connected resistor 336. The standoff terminal provides a means of electrically connecting circuit components in different compartments without introducing significant shunt capacity to the conductive housing.

Output signals from the oscillator stage 300 are applied to the automatic gain control stage 301 and to a detector and tuned circuit stage 357. Oscillator output signals developed across inductor 328 are inductively coupled to an inductor 338. The signal developed across the inductor 328 are coupled to a peak detector circuit 339, which includes inductor 338, diode 340, resistor 342, the inter-electrode capacity between the base and emitter electrodes of a transistor 346, and a resistor 348. The collector electrode of the transistor 346 is connected to the base electrode of the oscillator transistor 314. The voltage at junction 344, the output of the peak detector circuit 339, controls the base bias on transistor 346 and, hence, the impedance exhibited between the collector-emitter electrode current path of the transistor.

Since the collector-emitter electrode current path of the transistor 346 and the resistor 348 are connected between the base electrode of the transistor 314 and ground, the impedance of the transistor 346 controls the gain of the oscillator stage transistor 314 by adjusting the bias voltage applied to the base electrode of the transistor. When the output signal from the oscillator stage 300 developed across inductor 328 increases, the increased signal level is detected by the peak detector circuit 339 and the voltage applied to the base electrode of the transistor 346 increases. This causes the impedance exhibited by the collector-emitter electrode current path of the transistor 346 to decrease, and the voltage at the base electrode of the oscillator stage transistor 314 decreases, reducing the gain of the transistor.

If the oscillator stage output signals developed across inductor 328 decrease, the decreased signal level is detected by the peak detector circuit 339 and the voltage at the base electrode of the transistor 346 decreases. This causes the impedance exhibited by the collector-emitter electrode current path of transistor 346 to increase. Thus, an increased bias voltage is applied to the base electrode of the oscillator stage transistor 314, and the gain of the transistor increases. In the above manner, the oscillator stage output signals are maintained at a constant amplitude.

Output signals from the oscillator stage are applied to the detector and tuned circuit stage 357. The oscillator signals developed across the inductor 328 are inductively coupled to an inductor 350. The inductor 350 is coupled by a plug and jack 352 and the inner conductor of a coaxial cable 354 to a detector and tuned circuit stage 357 housed within a conductive housing 358. The conductive housing 358 is connected by the outer conductor of the coaxial cable 354 to the conductive housing 304. The conductive housing 358 is part of the information playback system stylus support arm housing. The signals developed across the inductor 350 are applied to a resistor 356 connected between the inner conductor of the coaxial cable 354 and the conductive housing 358. The leads of the resistor 356 are selected to act as a radiator for coupling the oscillator signals to a capacitively tuned, end loaded quarter wavelength wire transmission line 360.

The transmission line 360 is part of the tuned circuit stage 361 of stage 357 and is connected at one end to the conductive housing 358 and at the other end to a stylus 362. The stylus 362 may be of the type described in the two U.S. Patent Applications cited above. The quarter wavelength transmission line 360, in conjunction with the stray capacitances and inductances of the circuit components enclosed within the housing 358, has a nominal center frequency of 690 MHz. It should be noted that the nominal center frequency of the tuned circuit 361 may vary depending on the construction of the transmission line 360 and position of adjacent circuit components. The transmission line 360 may be fabricated from 3.6 inches of 0.020 inch diameter silver plated wire. Frequency modulated capacitive variations ranging over a band of frequencies from 500 KHz to 7.0 MHz recorded on a disc record 364 are detected by a stylus 362. The capacitive variations are coupled to the tuned circuit 361 and vary the resonant frequency of the tuned circuit plus or minus 200 KHz from its nominal center frequency at a rate ranging from 500 KHz to 7.0 MHz. Since the tuned circuit 361 is energized by the oscillator stage output signal, as the resonant frequency of the tuned circuit 361 varies, the response of the tuned circuit to the excitation signal voltage changes as a function of the recorded information. Consequently, the signal energy radiated by the tuned circuit 361 and inductively coupled to a pickup loop 366 are also modulated by the recorded information. The pickup loop is connected to a doubler type detector circuit 368.

The tuned circuit 361, because it utilizes a transmission line 360, exhibits a higher input impedance and smaller shunt capacity than the tuned circuit 165 shown in FIG. 2. This permits satisfactory operation for the information playback system with a lower level of energy injected into the tuned circuit 361 as compared to the circuit shown in FIG. 2. Consequently, problems associated with radiation of energy from the oscillator stage 300 are greatly reduced. Moreover, the buffer and power amplifier stages used in the information playback systems shown in FIGS. 1 and 2 are not needed.

The reduced shunt capacity exhibited by the tuned circuit 361 improves the performance of the information playback system. The percentage modulation of the signals detected by the detector circuit 368 is a function of the ratio of the change in the detected capacitance coupled by the stylus 362 to the tuned circuit 361 to the total shunt capacity of the tuned circuit. By reducing the shunt capacity of the tuned circuit 361, the percentage modulation of the signals detected by the detector circuit 368 is increased, thereby enhancing the operation of the system.

The detector circuit 368 includes the diodes 370 and 372, the capacitor 374, and the distributed capacity of a coaxial cable 376. The cathode of the diode 372 is connected by the inner conductor of the coaxial cable 376, a jack and plug 378, and a resistor 380 to the conductive housing 304. The doubler type detector circuit 368 functions to peak detect the signals developed across the pickup coil 366. Negative going portions of the signal developed by the pickup coil cause current to flow from ground through the diode 370, capacitor 374, and the pickup loop 366 to ground. This charges capacitor 370 positive to negative from the junction of the diodes to the pickup loop 366. On positive going portions of the signal developed at the pickup loop 366, since capacitor 374 cannot discharge through diode 370, the voltage across capacitor 374 adds to the positive portion of the voltage developed at the pickup loop 366, causing a current to flow through the diode 372. High frequency signal components at the cathode of the diode 372 are filtered by the capacitance between the inner and outer conductors of the coaxial cable 376.

Output signals from the detector and tuned circuit stage 357 are applied to a preamplifier stage 382 before application to the information playback system signal processing circuits. The preamplifier stage 382 is enclosed within a compartment 383 of the conductive housing 304. The voltage developed upon the inner conductor of the coaxial cable 376 via the jack and plug 378 to a peaking network 385 including an inductor 384, a variable capacitor 386, and resistors 448 and 450. The peaking network is coupled by a high pass filter 387 comprising a capacitor 388 and a resistor 390 to the base electrode of an NPN transistor 392. The high pass filter 387 eliminates circuit and record noise below 500 KHz, the lowest recorded signal frequency of interest.

Operating potential for the several transistors of the preamplifier stage 382 is obtained from terminal 394 of a feedthrough capacitor 396. The terminal 394 is connected to the jack 312 adapted to be connected to the source of operating potential. The terminal 394 is additionally connected to the conductive housing 304 by the series connected resistor 398 and capacitor 395 to provide a filtered DC potential at the junction 400.

Base bias for the transistor 392 is obtained from the junction 400 via resistor 402. Operating potential is applied to both the collector electrode of the transistor 392 and the base electrode of a PNP transistor 404 by a resistor 406. The signals applied to the base electrode of the transistor 392 are coupled to the base electrode of the transistor 404 whose collector electrode is directly connected to the base electrode of an NPN transistor 408 and by means of the series connected diodes 410 and 412 to the base electrode of a PNP transistor 414. The junction of the cathode of diode 412 and the base electrode of transistor 414 is connected to ground by a resistor 416.

The emitter-collector electrode current path of the NPN transistor 408 and the PNP transistor 414 are connected in series with a resistor 418 between the junction 400, and hence the source of operating potential, and ground. The transistor 408 and 414 are connected to an output jack terminal 422 by a capacitor 424. The transistors 408 and 414 are connected in a manner to provide a low output impedance at the jack 422 which is connected to the information playback system signal processing circuits, now shown. Negative feedback controls the gain of the preamplifier stage 382. The feedback is provided by a voltage obtained at the emitter electrode of the transistor 414 and applied to the emitter electrode of the transistor 392 by the voltage dividing resistors 426 and 428.

The operating frequency of the oscillator stage 300 is adjustable over a range of frequencies varying from approximately 655 MHz to 725 MHz. When the variable capacitance diode 327 has maximum reverse bias applied across its cathode-anode electrodes, the device exhibits minimum capacity and the oscillator stage provides 725 MHz output signals to the detector and tuned circuit stage 357. When minimum reverse bias is applied across the cathode-anode electrodes of the variable capacitance diode 327, the device exhibits maximum capacity. Under these conditions, the oscillator provides 655 MHz output signals for the system. Under normal conditions the oscillator operates at 683 MHz, 7 MHz below the nominal center frequency of the tuned circuit 357.

Bias for the variable capacitance diode 327 is obtained from an automatic frequency control stage 429. The voltage at a junction 430, the voltage across feedthrough capacitor 432 and capacitor 452, is applied to the variable capacitance diode 327 through a series connected resistor 434, inductor 436, and standoff terminal 438. The inductor 436 decouples the signal energy of the oscillator transistor 314 from the junction 430. The feedthrough capacitor 432 and capacitor 452 are charged from the source of operating potential applied to the terminal 312 through a resistor 440. The junction 430 is connected to ground through the terminal 442 of the feedthrough capacitor 432, the collector-emitter electrode current path of a transistor 444 and a resistor 446. The collector-emitter electrode current path of the transistor 444, in conjunction with the resistors 440 and 446 form a voltage divider circuit for the voltage applied to the terminal 312. The voltage at the junction 430 is determined by the impedance exhibited by the collector-emitter electrode current path of the transistor 444 which changes the ratio of impedance of the voltage divider circuit, and hence the voltage at the junction.

The base electrode of the transistor 444 is connected by a variable resistor 448 and a resistor 450 to a junction 389, the output of the peaking network coupled to the detector circuit 368. A capacitor 452 is connected between the collector electrode of the transistor 444 and ground. Capacitor 452, in conjunction with feedthrough capacitor 432, limits the upper frequency response of the transistor 444. The capacitors limit the frequency response of the automatic frequency control stage 429 to below 5 KHz. Thus, the automatic frequency control stage 429 operates well below the frequency range of the signal information recorded on the record medium, 500 MHz to 7.0 MHz. Changes in the conductivity of the collector-emitter electrode current path of the transistor 444 result in a change in the voltage at the junction 430, and hence a change in the reverse bias applied to the variable capacitance diode 327. The change is in a direction to maintain a constant frequency separation between the nominal center frequency of the tuned circuit 361 and the operating frequency of the oscillator transistor 314.

If the nominal center frequency of the tuned circuit increases, the operating point on the tuned circuit frequency response will change and the signal injected into the tuned circuit 361 from the oscillator becomes located lower on the low frequency side of the tuned circuit frequency response than occurs during normal operation. Consequently, the voltage at the output of the detector circuit 368 and the junction 389 decreases. As the voltage at the junction 389 decreases, a decreasing voltage is applied to the base electrode of the transistor 444 causing the collector-emitter electrode current path of the device to exhibit an increased impedance. When this occurs, the voltage at the junction 430 increases and a greater reverse bias is applied across the variable capacitance diode 327. An increase in reverse bias applied across the variable capacitance diode 327 causes the diode to exhibit a reduced capacity, and the operating frequency of the oscillator stage 300 increases. The increase in operating frequency is sufficient to re-establish the 7 MHz separation between the nominal center frequency of the tuned circuit 361, and the information playback system operates at the proper point on the slope of the tuned circuit frequency response.

If the nominal center frequency of the tuned circuit decreases, the operating point on the tuned circuit frequency response will change. The signal injected into the tuned circuit 361 becomes located higher on the low frequency side of the tuned circuit frequency response than occurs during normal operation. Consequently, the voltage at the output of the detector circuit 368 and the junction 389 increases. An increased bias voltage is applied to the base electrode of the transistor 444 causing the collector-emitter electrode current path of the transistor to exhibit a decreased impedance. Thus, the voltage at the junction 430 decreases and a reduced reverse bias is applied across the variable capacitance diode 327. The diode 327 under these conditions displays an increased capacity, and the operating frequency of the oscillator stage 300 decreases. The decrease in operating frequency of the oscillator transistor 314 is sufficient to re-establish the 7 MHz frequency separation between the nominal center frequency of the tuned circuit and the frequency of the oscillator output signals, and the information playback system operates at the proper point on the slope of the tuned circuit frequency response.

Where the frequency separation between the frequency of the oscillator output signal and the nominal center frequency of the tuned circuit exceeds a limit, as determined by the tap adjustment of the variable resistor 448, the voltage at the junction 430 decreases to a level where transistor 444 is biased out of conduction. The voltage at the collector electrode of the transistor 444, and hence junction 430, increases. A search control stage 454 senses the tuning voltage applied to the variable capacitance diode 327 from the junction 430. When the voltage at the junction 430 exceeds the turn-on voltage level for unijunction transistor 456, the search control stage 454 is rendered operative. The turn-on voltage level is reached when the operating frequency of the oscillator stage is above the nominal center frequency of the tuned circuit 361.

Capacitors 432 and 452 charge toward a voltage level determined by the source of operating potential applied to the terminal 312. At approximately +11 volts, the turn-on voltage level for the transistor 456 is reached, and the device is biased into conduction, discharging capacitors 432 and 452 through the emitter-first base electrode current path of the transistor and an inductor 458 to ground. After capacitors 432 and 452 discharge, the unijunction transistor 456 becomes biased out of conduction. Operating potential for the unijunction transistor is obtained from the source of operating potential applied to the terminal 312 and coupled to the transistor second base electrode.

The discharge of capacitors 432 and 452 causes the voltage at the junction 430 to drop. When this occurs, the reverse bias across the variable capacitance diode 327 decreases and the device exhibits an increased capacity, causing the oscillator stage operating frequency to be readjusted to an initial condition. The oscillator output signal frequency at the intitial condition is approximately 655 MHz, significantly below the normal operating point on the lower frequency side of the tuned circuit frequency response.

As the capacitors 432 and 452 begin to charge from the source of operating potential applied to the terminal 312 through the resistor 440, the voltage at the junction 430 increases. The increasing voltage causes an increased reverse bias to be applied across the variable capacitance diode 327. The changing capacitance of the variable capacitance diode 327 sweeps the operating frequency of the oscillator stage 300 upward, and the voltage at the junction 389 begins to rise. As the frequency of the output signals from the oscillator begins to approach its proper position in relation to the nominal center frequency of the tuned circuit, a voltage develops at the junction 389 which biases the transistor 444 sufficiently into conduction to reestablish the 7 MHz separation between the frequency of the oscillator output signals and the nominal center frequency of the tuned circuit 361. If, however the operating frequency of the oscillator stage 300 sweeps past its proper position, the search stage 454 is actuated and the process repeated.

What is claimed is:

1. An information playback system, comprising:

- a disc record having a spiral groove with video information recorded therein over a band of frequencies as capacitive variations;
- means for rotating said disc record;
- a tracking stylus engaging said record groove for detecting the capacitive variations as said disc record is rotated;
- a detector and tuned circuit stage coupled to said stylus;
- an oscillator stage providing output signals, said oscillator stage tunable over a band of frequencies;
- means coupling the output signals from said oscillator stage to said detector and tuned circuit stage;
- an automatic frequency control stage coupled between said detector and tuned circuit stage and said oscillator stage, said automatic frequency control stage controlling the operating frequency of said oscillator stage in response to frequency changes in said detector and tuned circuit stage;
- an automatic gain control stage coupled between said coupling means and said oscillator stage, said automatic gain control stage maintaining the amplitude of said oscillator stage output signals coupled to said detector and tuned circuit stage at a constant level;
- a search control stage coupled to said oscillator stage, said search control stage operable to tune said oscillator stage to an initial condition such that the frequency of said oscillator output signals are within the operating range of said automatic frequency control stage when the frequency separation between the frequency of said oscillator stage output signals and the nominal center frequency of said tuned circuit exceeds a predetermined limit; and
- an amplifier stage coupled to said detector and tuned circuit stage.

2. An information playback system as defined in claim 1 wherein said coupling means includes a buffer amplifier stage and a power amplifier stage.

3. Information playback apparatus, for use with a record medium having recorded thereon information desirably occupying a given band of frequencies upon playback, said apparatus comprising:

a first resonant circuit;

a source of oscillations including a second resonant circuit, the tuning of said second resonant circuit determining the frequency of oscillations developed by said source;

means for energizing said first resonant circuit with oscillations from said source;

pickup means for altering the tuning of said first resonant circuit in accordance with said information recorded on said record medium thereby to alter the amplitude of energizing oscillations appearing across said first resonant circuit in accordance with said recorded information;

detecting means coupled to said first resonant circuit for developing an output signal representative of the amplitude of oscillations appearing across said first resonant circuit; and means coupled to said detecting means and responsive to said output signal for maintaining the frequency difference between the resonant frequency of said first resonant circuit and the frequency of said energizing oscillations substantially free of variations in a frequency band lower than said given band of frequencies.

4. Apparatus in accordance with claim 3 wherein said frequency difference maintaining means comprises:

a voltage variable capacitance included in one of said first and second resonant circuits;

means coupled to said detecting means for deriving from said detecting means output signal a control voltage indicative of variations, if any, in said frequency difference at frequencies in said lower band; and means for utilizing said control voltage to control the capacitance exhibited by said voltage variable capacitance.

5. Apparatus in accordance with claim 4 wherein said control voltage deriving means includes means for rendering the control voltage derivation substantially independent of variations in said frequency difference at frequencies within said given band of information frequencies.

6. Apparatus in accordance with claim 5 also including:

recorded information utilization means;

filter means coupled between said detecting means and said recorded information utilization means for passing to said utilization means components of said detecting means output signal falling within said given band of information frequencies to the substantial exclusion of components of said detecting means output signal falling within said lower band.

7. Apparatus in accordance with claim 6 also including automatic gain control means coupled to said oscillation source for opposing variations in the amplitude of the oscillations developed by said source.

8. Apparatus in accordance with claim 7 wherein said voltage variable capacitance comprises a variable capacitance diode included in said second resonant circuit for determining the frequency of oscillations developed by said source.

9. Apparatus in accordance with claim 5 also including means responsive to said control voltage for sweeping the value of capacitance exhibited by said voltage variable capacitance over a predetermined range of capacitance values, said sweeping means being disabled when the output of said control voltage deriving means falls within a given range of amplitude values.

10. Apparatus in accordance with claim 9 wherein said control voltage deriving means includes sweep threshold control means for establishing the output of said control voltage deriving means at an amplitude outside said given range of amplitude values under conditions of substantial equality between the frequency of said energizing oscillations and the resonant frequency of said first resonant circuit.

11. Information playback apparatus, for use with a record medium having recorded thereon information desirably occupying a given band of frequencies upon playback, said apparatus comprising:

a first resonant circuit;

a source of oscillations including a second resonant circuit, the tuning of said second resonant circuit determining the frequency of oscillations developed by said source;

means for energizing said first resonant circuit with oscillations from said source;

pickup means for altering the tuning of said first resonant circuit in accordance with said information recorded on said record medium thereby to alter the amplitude of energizing oscillations appearing across said first resonant circuit in accordance with said recorded information;

detecting means coupled to said first resonant circuit for developing an output signal representative of the amplitude of oscillations appearing across said first resonant circuit;

means, coupled to said detecting means and responsive to said output signal, for amplifying components of said output signal falling within said given band of information frequencies to the substantial exclusion of components of said output signal falling within a second band of frequencies lower than said given band;

recorded information utilization means responsive to the output of said amplifying means;

a voltage variable capacitance included in one of said first and second resonant circuits;

means coupled to said detecting means for deriving from said detecting means output signal a control voltage representative of output signal components falling within said second band to the substantial exclusion of output signal components falling within said given band; and means utilizing said control voltage to control the capacitance exhibited by said voltage variable capacitance.

12. Apparatus in accordance with claim 11 wherein said pickup means includes a stylus cooperating with said record medium during playback to establish a capacitance subject to variation in accordance with said recorded information; and wherein said second resonant circuit includes:

said stylus-established capacitance, and a transmission line coupled to said stylus and having a length which is less than a wavelength at the frequency of said energizing oscillations.

* * * * *